United States Patent [19]

Hamane et al.

[11] 4,369,674
[45] Jan. 25, 1983

[54] POWER TRANSMISSION DEVICE

[75] Inventors: Masumi Hamane, Kawagoe; Makoto Kondo, Ooi, both of Japan

[73] Assignee: Honda Giken Kogyo Kabushiki Kaisha, Tokyo, Japan

[21] Appl. No.: 150,620

[22] Filed: May 15, 1980

[30] Foreign Application Priority Data

May 18, 1979 [JP] Japan .................................. 54-61750

[51] Int. Cl.³ .......................................... F16H 3/74
[52] U.S. Cl. .................................. 74/752 E; 74/411;
74/781 R
[58] Field of Search ................... 74/752 E, 781 R, 411

[56] References Cited

U.S. PATENT DOCUMENTS

| 2,077,387 | 4/1937 | Banker .............................. 74/752 E |
| 2,189,220 | 2/1940 | Osborne ............................ 74/781 R |
| 2,649,817 | 8/1953 | Voque .............................. 74/752 E |

FOREIGN PATENT DOCUMENTS

| 1135256 | 8/1962 | Fed. Rep. of Germany ........ 74/411 |
| 48-96383 | 12/1972 | Japan . |
| 42889 | 5/1925 | Norway .......................... 74/781 R |
| 910751 | 11/1962 | United Kingdom ................. 74/411 |

*Primary Examiner*—Kenneth Dorner

*Attorney, Agent, or Firm*—Armstrong, Nikaido, Marmelstein & Kubovcik

[57] ABSTRACT

A light, miniaturized power transmission device of the type wherein the power from a drive shaft is transmitted to a driven shaft via a planetary gear mechanism. The planetary gear mechanism has a ring gear, a sun gear disposed concentrically on the radially inner side of the ring gear, and planetary gears disposed between and engaged with the sun gear and the ring gear. At least the meshing portions of the planetary gears, ring gear and sun gear are resiliently held from opposite side surfaces thereof by a pair of side plates attached to said planetary gear mechanism. The side plates permit free orbital movements of the planetary gears and suppresses the relative axial movements of the ring gear, planetary gears and sun gear. A centrifugally operated friction clutch is disposed between the drive shaft and the planetary gear mechanism so as to control the transmission of power from the drive shaft to the planetary gear mechanism. The clutch comprises an annular outer contactor integrally formed with the ring gear, and inner contactors which are connected to the drive shaft for rotation therewith and adapted to be placed under a centrifugal force into frictional contact with the annular outer contactor to thereby transmit the rotation of the drive shaft to the ring gear when the number of revolutions of the drive shaft exceeds a predetermined level.

9 Claims, 7 Drawing Figures

FIG. 4
FIG. 3
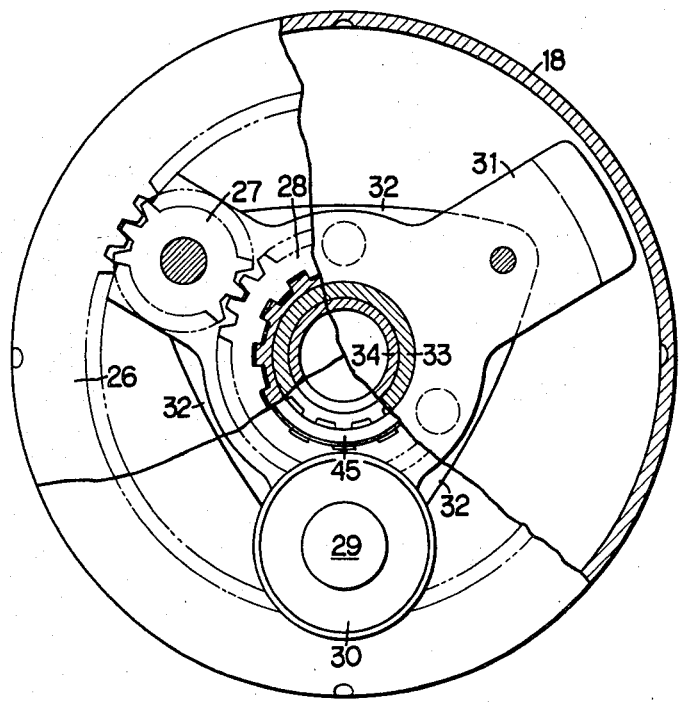
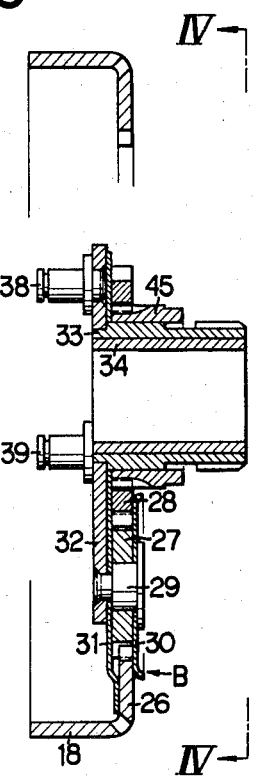
FIG. 5
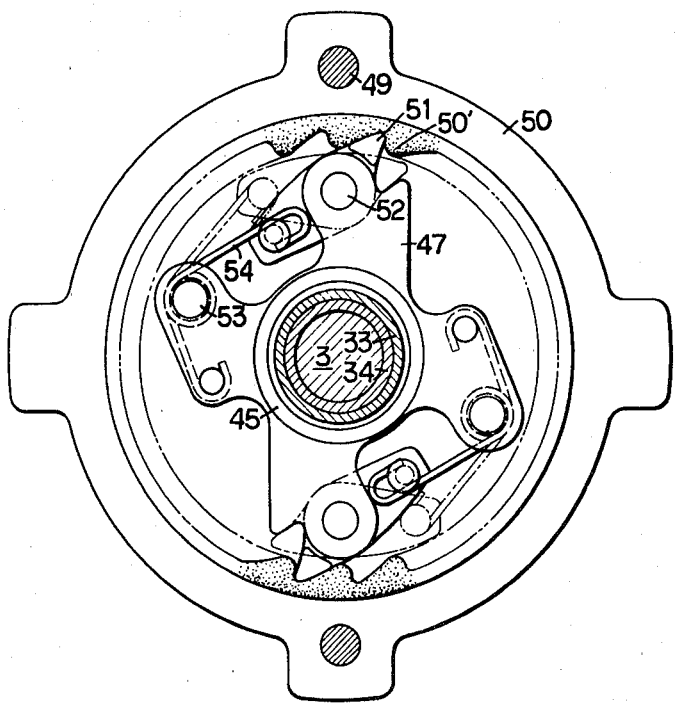

POWER TRANSMISSION DEVICE

BACKGROUND OF THE INVENTION

1. Field of the Invention

The present invention relates to a power transmission device of the type wherein the power from a drive shaft is transmitted to a driven shaft via a planetary gear mechanism.

2. Description of the Prior Art

A planetary gear mechanism is generally provided with a ring gear, planetary gears and a sun gear. In order to allow the planetary gears to make a smooth orbital movement, it is necessary that the relative axial movement thereof between the ring gear and sun gear be suppressed to a suitable extent and that the orbit of the planetary gears be kept accurately concentrical with the pitch circles of the ring gear and sun gear. In a conventional planetary gear mechanism, the ring gear, planetary gears and sun gear have the respective gear supporting mechanisms. This causes the structure of the planetary gear mechanism to be complicated. Moreover, the space occupied by the gear supporting mechanisms is increased. Accordingly, the miniaturization and reduction of weight of the planetary gears are restricted to a great extent. In addition, the centering of the gears requires a high-precision processing technique. When the gears make even a slight eccentric rotation, they are not engaged with each other accurately. As a result, noises increase and the gears are worn early.

In order to transmit power from the drive shaft to the planetary gears and interrupt such transmission of power, by a centrifugally operated friction clutch, an inner contactor of the centrifugally operated friction clutch is rotated first by the drive shaft.

The inner contactor generally has on its outer circumferential surface a lining to increase the frictional force between the contact surfaces of the inner contactor and an outer contactor. When the number of revolutions of the drive shaft exceeds a predetermined level, the inner contactor is radially outwardly moved by a centrifugal force to come into frictional contact with the outer contactor and thereby transmit the rotation of the drive shaft to the outer contactor.

The rotation of the outer contactor of the centrifugally operated friction clutch is immediately transmitted to the ring gear in the planetary gear mechanism. When the ring gear is rotated, the planetary gears engaged therewith are orbited around the sun gear as the planetary gears revolve around their own axes. During such a movement of the planetary gears, they transmit only their orbital movements to a driven shaft.

Since the outer contactor of the centrifugally operated friction clutch in a conventional power transmission device and the ring gear in the planetary gear mechanism in the same device are separately constructed, it is necessary that the power transmission device be provided with not only a torque transmission means between the outer contactor and the ring gear but also a support means for separately supporting the outer contactor and ring gear.

The centering of the outer contactor and ring gear requires a high-precision processing technique. When the ring gear in particular is even slightly eccentric, the gears are not engaged with each other accurately. This causes an increase in noises and an early wear on the gears.

Since the outer contactor and ring gear are rotated with the respective bearing portions, an increased inertia force is generated and a great shock occurs due to a sudden operation of the clutch.

SUMMARY OF THE INVENTION

An object of the present invention is to provide a power transmission device of a simple structure and a small bulk comprising a light, miniaturized planetary gear mechanism which can be operated as it is subjected to an automatic centering without using any specially high precision processing technique.

To achieve the above object, according to the invention, there is provided an improved power transmission device for transmitting power from a drive shaft to a driven shaft by way of a planetary gear mechanism which includes a ring gear, a sun gear disposed concentrically on the radially inner side of the ring gear, and planetary gears disposed between and engaged with the sun gear and the ring gear. A pair of side plates are attached to the planetary gear mechanism for holding the meshing portions of the planetary gears, the ring gear and the sun gear from the opposite sides of these gears for free sliding movement relative thereto, the side plates acting to suppress relative axial movements of the ring gear, the planetary gears and the sun gear while permitting free orbital movements of the planetary gears.

Another object of the present invention is to provide a light, miniaturized, simply constructed power transmission device having a planetary gear mechanism and a centrifugally operated friction clutch in which an outer contactor in the clutch, and a ring gear in the planetary gear mechanism are integrally formed to omit bearings therefor so that the outer contactor and the ring gear can be automatically centered to thereby minimize gear noises, improve durability of the gears, minimize shocks due to a sudden operation of the clutch, and increase the underdamping effect.

The above and other objects as well as advantageous features of the invention will become apparent from the following description of the preferred embodiments when taken in conjunction with the accompanying drawings.

BRIEF DESCRIPTION OF THE DRAWINGS

FIG. 3 is a side elevational view in section of a principal portion of the embodiment shown in FIG. 1;

FIG. 4 is a side elevational view partially in section taken along the line IV—IV in FIG. 3;

FIG. 5 is an enlarged cross-sectional view, taken along the line V—V in FIG. 1, of a principal portion of the embodiment shown in FIG. 1;

DESCRIPTION OF THE PREFERRED EMBODIMENTS

An embodiment of the present invention applied to a drive means in a small motorcycle will be described with reference to the accompanying drawings.

Figure 1:
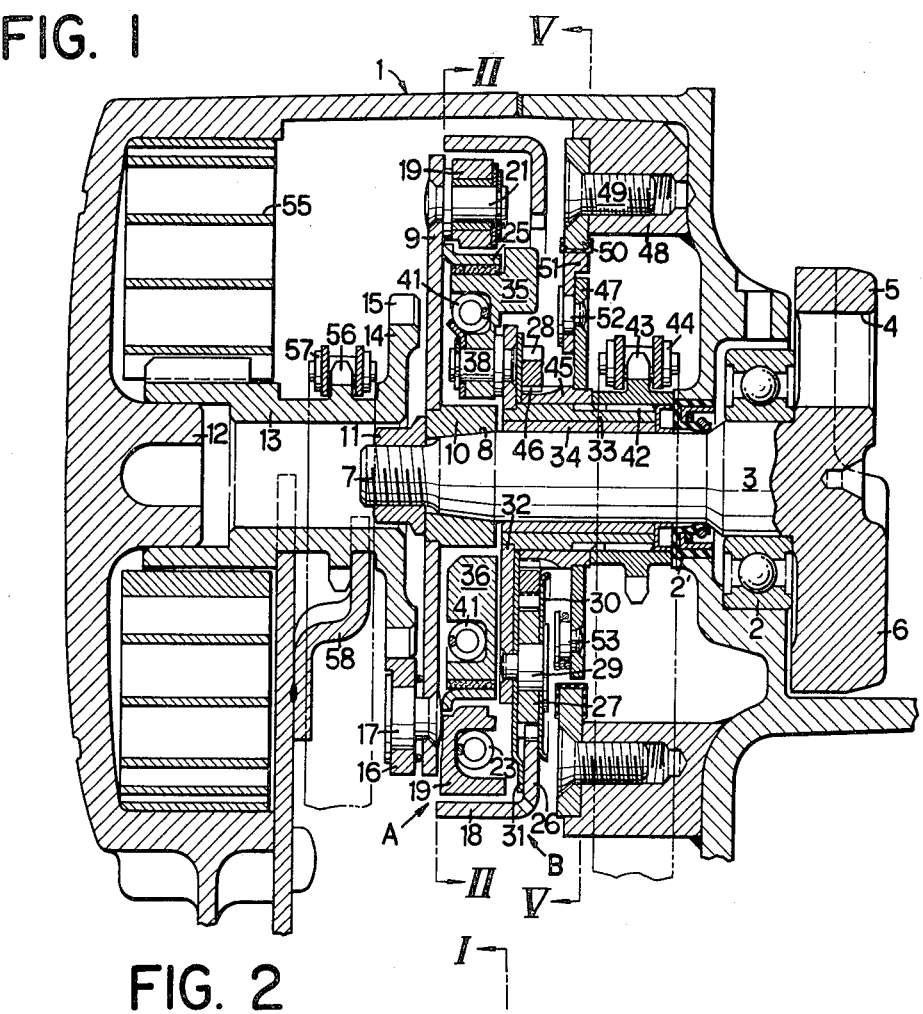
FIG. 1 is a longitudinal sectional view, taken along the line I—I in FIG. 2, of a power transmission device embodying the present invention and applied to a drive unit in a miniaturized motorcycle.

Referring to FIG. 1, a drive shaft 3 is provided via bearings 2 and a seal member 2' in a casing 1 which contains a lubricating oil sealed therein.

A crank arm 5 having a crank pin supporting bore 4, and a counter weight 6 are provided at the inner end portion of the drive shaft 3, i.e. at that end portion of the drive shaft 3 which is on the side of an engine room. The drive shaft 3 has a male screw 7 formed on the outer end portion thereof and a tapered surface 8 adjacent to the male screw 7.

A boss member 10 formed integrally with the central portion of a drive power transmission plate 9 is fitted around the tapered surface 8 and tightly secured thereto with a nut 11 engaged with the male screw 7.

A ratchet pawl 16 is pivotally supported on a pin 17 on the outer side of the drive power transmission plate 9, i.e. on the side opposite to the engine room. This ratchet pawl 16 is engageable with ratchet teeth 15 when the engine is started, the ratchet teeth 15 being provided on the outer circumferential surface of a flange 14 formed at one end portion of a hollow engine starting shaft 13 which is rotatably fitted at the other end portion thereof around a support shaft 12 projected from the inner surface of the casing 1 toward the drive shaft 3.

Figure 2:
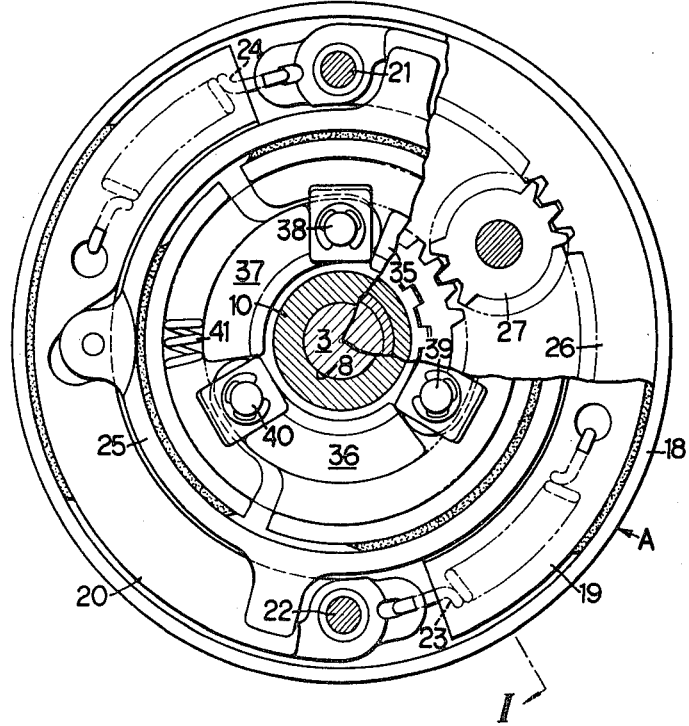
FIG. 2 is a cross-sectional view taken along the line II—II in FIG. 1.

Referring to FIGS. 1 and 2, an outer annular contactor 18 supported on another member, and a pair of inner arcuate contactors 19, 20 which constitute a centrifugally operated friction clutch A according to the present invention and which are pivotally supported on pins 21, 22 at the respective base end portions which are in opposite positions with respect to the diameter of the outer annular contactor 18. Each of the inner arcuate contactors 19, 20 is provided with a lining on the outer circumferential surface thereof for increasing the frictional force between the outer circumferential surface of the inner arcuate contactors 19, 20 and the inner circumferential surface of the outer annular contactor 18. Tension coil springs 23, 24 are provided between the front end portion of the inner arcuate contactor 19 and the base end portion of the inner arcuate contactor 20, and between the front end portion of the inner arcuate contactor 20 and the base end portion of the inner arcuate contactor 19. Owing to these tension coil springs 23, 24, the inner arcuate contactors 19, 20, which are normally not pressed against the outer annular contactor 18, come into frictional contact with the outer annular contactor 18 due to a centrifugal force when the number of revolutions of the drive shaft 3 exceeds a predetermined level. Thus, the rotational movement of the drive shaft 3 is transmitted to the outer annular contactor 18.

At least a part of the outer annular contactor 18 and inner arcuate contactors 19, 20, which constitute the centrifugally operated friction clutch A is immersed in the lubricating oil in the casing 1.

A second outer annular contactor 25, which constitutes a second centrifugally operated friction clutch, is secured to that portion of the inner surface of the drive power transmission plate 9 which is radially on the inner side than the inner arcuate contactors 19, 20. This second centrifugally operated friction clutch will be described later.

Referring to FIGS. 1, 3 and 4, a ring gear 26, which constitutes a part of a planetary gear mechanism B in the present invention, is formed integrally with that end portion of the outer annular contactor 18 which is on the side of the engine room. This ring gear 26 integrally formed with the outer annular contactor 18 is engaged with three planetary gears 27, which are engaged with a sun gear 28.

Each of the planetary gears 27 carries a pair of side plates 30, 31 on both side surfaces thereof.

A planetary gear supporting pin 29, whereby each of the planetary gears 27 is supported rotatably and in a spaced relationship on a planetary gear supporting plate 32, also supports the side plate 30 such that the side plate 30 can be rotated relative to the pin 29.

The side plates 30, 31 are extended beyond the outer periphery of the planetary gear 27 and up to both side surfaces of the ring gear 26 and sun gear 28, and relatively slidably hold the ring gear 26 and sun gear 28 from both side surfaces thereof such that the side plates 30, 31 cooperate with each other so as to suppress the relative axial movements of the ring gear 26 and sun gear 28 with respect to the planetary gear 27. Each of the side plates 30 is formed circularly and provided concentrically with the planetary gear 27. The peripheral portion of the side plate 30 is bent away from the side surface of the gear 27 so that the peripheral portion of the side plate 30 has a smooth cross-sectional shape. Thus, a smooth relative sliding contact between the peripheral portion of the side plate 30 and the gear 26 is promoted.

On the other hand, the side plate 31 consists of a one-piece plate extended over the three planetary gears 27. The ring gear 26 has an axial width smaller than that of the planetary gears 27. The peripheral portion of the side plate 31 is bent so as to resiliently contact the side surface of the ring gear 26. As a result, the ring gear 26 is held by the side plates 30, 31 at an increased resiliency.

A planetary gear supporting plate 32 is fixedly mounted on the outer circumferential surface of one end portion of a hollow driven shaft 33 fitted around the drive shaft 3 via a bearing 34, and a sprocket 43 is mounted on the circumferential surface of the other end portion of the driven shaft 33 via a spline 42. The sprocket 43 is operatively connected in the casing 1 to a sprocket on the side of a drive wheel via a drive chain 44. In this case, at least a part of the drive chain 44 may be immersed in the lubricating oil in the casing 1 with or without immersing a part of the centrifugally operated friction clutch A in the same lubricating oil as mentioned above.

Referring to FIGS. 1 and 2, three inner arcuate contactors 35, 36, 37 are pivotally supported by pins 38, 39, 40 on that side surface of the planetary gear supporting plate 32 which is not opposed to the engine room. Linings are provided on the outer circumferential surfaces of the inner arcuate contactors 35, 36, 37 for the purpose of increasing a frictional force generated between the outer circumferential surfaces of the inner arcuate contactors 35, 36, 37 and the inner circumferential surface of the outer annular contactor 25. Each of these inner arcuate contactors 35, 36, 37 has a circumferentially extended groove, in which a coil spring 41 common to the contactors 35, 36, 37 is provided. Owing to the coil spring 41, the inner arcuate contactors 35, 36, 37, which are normally not pressed against the outer annular contactor 25, come into frictional contact therewith by a centrifugal force when the number of orbital motion of the planetary gear 27 exceeds a predetermined level, to thereby stop the relative rotations of the planetary gear 27 and drive shaft 3. At this time, the planetary gear 27 is not rotated around its own axis; the planetary gear 27 as well as drive shaft 3, inner arcuate contactor 19, outer annular contactor 18, ring gear 26, planetary gear supporting plate 32 and driven shaft 33 are rotated together with the sun gear 28.

The sun gear 28 is mounted via a spline 46 on the outer circumferential surface of one end portion of a sleeve 45 which is mounted on the driven shaft 33 such that the sleeve 45 can be rotated relative to the driven shaft 33, and a ratchet pawl supporting plate 47 is fixedly mounted on the outer circumferential surface of the other end portion of the sleeve 45.

Referring to FIGS. 1 and 5, the ratchet pawl supporting plate 47 is provided with a pair of ratchet pawls 51 which are pivotally supported thereon by pins 52. The ratchet pawls 51 is adapted to be engaged with ratchet teeth 50′ formed on the inner circumferential portion of an annular ratchet teeth supporting member 50 which is attached with bolts 49 to a bracket 48 projected from the inner surface of the casing 1. The ratchet pawls 51 is constantly biased so as to be engaged with the ratchet teeth 50′ by a spring 54 supported on a shaft 53 of the ratchet pawl supporting plate 47.

When the ratchet pawls 51 receive a rotational force exceeding a predetermined level in the same direction in which the drive shaft 3 is rotated, the ratchet pawls 51 are disengaged from the ratchet teeth 50′ so as to be swung by a centrifugal force to positions illustrated by chain lines in FIG. 5, where the ratchet pawls 51 are not in contact with the ratchet teeth 50′. In other words, when the inner arcuate contactors 35, 36, 37 come into frictional contact with the outer annular contactor 25 to allow the ring gear 26, planetary gear 27, sun gear 28 and driven shaft 33 to be rotated together with the drive shaft 3, the ratchet pawls 51 are swung away from the ratchet teeth 50′ to positions where the ratchet pawls 51 are not in contact with the ratchet teeth 50′. This allows the ratchet pawls and teeth 51, 50′ to generate no meshing sounds therebetween when the drive shaft 3 is rotated at a high speed without reducing the speed.

Even when the sun gear 28 comes near being rotated in a direction opposite to the direction in which the drive shaft 3 is rotated, the ratchet pawls 51 safely come into engagement with the ratchet teeth 50′ so that the rotation in the aforesaid direction of the sun gear 28 can be prevented.

Referring to FIG. 1, an energy storing coiled spring 55 is fastened at its one end to the outer circumferential surface of the outer end portion of the hollow, engine starting shaft 13, and at the other end thereof to the inner surface of the casing 1. An energy storing transmission chain 57 is provided between a sprocket 56, which is integrally formed on the outer circumferential surface of the hollow, engine starting shaft 13, and a sprocket (not shown) cooperating with an engine starting pedal (not shown). The hollow, engine starting shaft 13 is supported reinforcingly in a pressed manner by a reinforcing presser member 58.

In the above-described construction, the engine starting pedal is stepped to rotate the hollow, engine starting shaft 13 via the energy transmission chain 57 so that energy is stored in the energy storing coiled spring 55.

When the energy stored in the spring 55 is released at a time, a rotational force is thereby generated, which is transmitted to the engine via the hollow, engine starting shaft 13, ratchet pawl 16, drive power transmission plate 9 and drive shaft 3, to start the engine.

When the engine is started, the rotational force generated thereby is transmitted to the drive shaft 3 and the drive power transmission plate 9 so that the ratchet pawl 16 is disengaged from the ratchet teeth 15 by a centrifugal force. When the number of revolutions of the engine exceeds a predetermined level, the inner arcuate contactors 19, 20 come into frictional contact with the outer annular contactor 18. As a result, the rotation of the drive shaft 3 is transmitted to the drive wheel via the outer annular contactor 18, ring gear 26, planetary gear 27, planetary gear supporting plate 32, driven shaft 33, sprocket 43 and drive chain 44. While the rotation of the drive shaft 3 is thus transmitted to the drive wheel, the ratchet pawls 51 are engaged with the ratchet teeth 50′ so that the sun gear 28 is not rotated.

Since a lubricating oil is sealed in the casing 1 such that at least a part of the centrifugally operated friction clutch A is immersed therein in a normal condition, the lubricating oil is scooped up by the clutch A as it is rotated, so as to be supplied to the planetary gear mechanism B disposed adjacent to the clutch A. Since no partition wall is provided between the clutch A and planetary gear mechanism B, nothing obstructs the flow of the lubricating oil. Namely, the lubricating oil scooped up by the clutch A can be effectively supplied to the planetary gear mechanism B.

When at least a part of the drive chain 44 is immersed in the lubricating oil in the casing 1 with or without immersing the centrifugally operated friction clutch A in the same lubricating oil, the oil can be scooped up by the chain 44 in accordance with the rotation of the drive chain 44 so as to be supplied to the planetary gear mechanism B disposed adjacent to the drive chain 44. Since the drive chain 44 is disposed on the opposite side of the centrifugally operated friction clutch A with respect to the planetary gear mechanism B, and since the ratchet pawl supporting plate 47 fixed to the sun gear is not rotated, nothing obstructs the lubricating effect of the drive chain 44 on the planetary gear mechanism. Namely, the planetary gear mechanism can be smoothly lubricated.

When the number of revolutions of the drive shaft 3 is further increased to reach a high speed region, the inner arcuate contactors 35, 36, 37 come into frictional contact with the outer annular contactor 25 so that the ring gear 26, planetary gear 27 and sun gear 28 are rotated with the drive shaft 3 in the same direction. As a result, the ratchet pawls 51 are disengaged from the ratchet teeth 50′. Consequently, the driven shaft 33 and sprocket 43 are rotated at the same speed as the drive shaft 3, and the rotational force is transmitted to the drive wheel via the drive chain 44.

At this time, the ring gear 26, planetary gear 27 and sun gear 28 are rotated together so that the planetary gear mechanism B requires no lubricating oil in particular.

Figure 7:
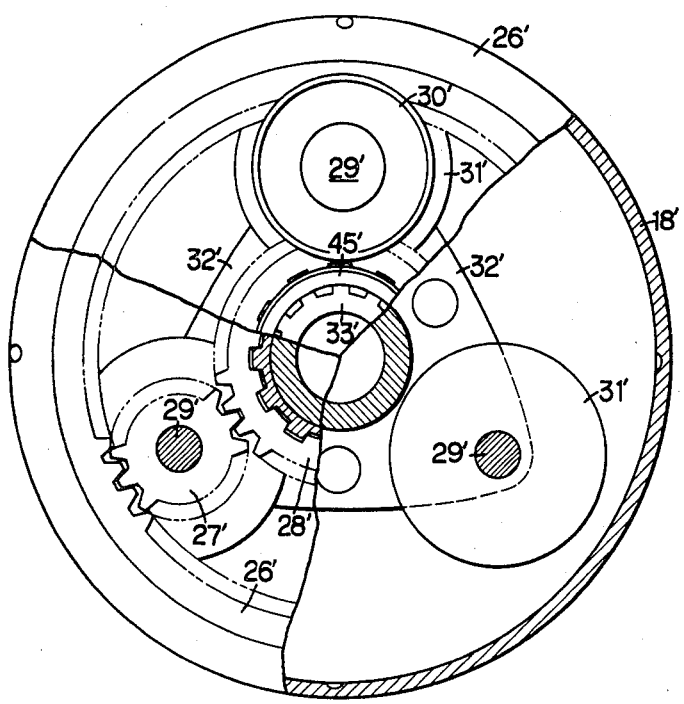
FIG. 7 is a side elevational view partially in section taken along the line VII—VII in FIG. 6.
Figure 6:
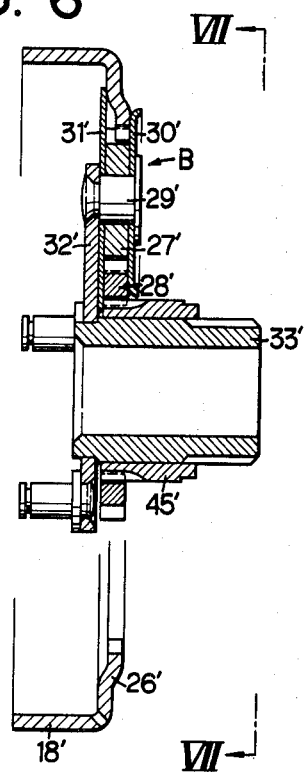
FIG. 6 is a longitudinal sectional view similar to FIG. 3 of another embodiment of the present invention.

FIGS. 6 and 7 illustrate another example of planetary gear mechanism B.

In this planetary gear mechanism, a ring gear 26′ integrally formed with an outer annular contactor which constitutes a centrifugally operated friction clutch in the present invention has an annular bent portion. A pair of side plates 30′, 31′ supported on planetary gears 27' pivotally connected by pins 29' to a planetary gear supporting plate 32' which is mounted on a driven shaft 33' are circularly formed and extended up to the bent portion of the ring gear 26' and the side surface of the sun gear 28' spline-connected to a sleeve 45'. The circular side plates 30', 31' can be simply formed. The ring gear 26' having an annular bent portion is held by a pair of side plates 30', 31'. Therefore, the resilient holding capability of the side plates 30', 31' can be effectively utilized.

As described in the foregoing, in accordance with the present invention, a pair of side plates attached to the planetary gear mechanism act to clampingly hold at least the intermeshing portions of the ring gear, the planetary gears and the sun gear from the opposite sides of these gears for free sliding movement relative thereto, suppressing relative axial movements of the ring gear, the planetary gears and the sun gear while permitting free orbital movements of the planetary gears. This arrangement not only contributes much to the simplification of construction, reduction in installation space, miniaturization in size and weight of the planetary gear mechanism but also enables the automatic centering of the respective gears. As a result, there is no need for any special precision processing with high tolerances and smooth meshing engagements between various gears are ensured to reduce generation of noises, excessive wear and damages due to improper gear engagements for improved durability.

Further, the outer contactor of the centrifugally operated friction clutch is formed integrally with the ring gear of the planetary gear mechanism, which adds to the further simplification of construction, processing and assembling operations and also to the reduction in the overall weight of the outer contactor and the ring gear as compared with the conventional separate formation of these components to thereby minimize damages and shocks due to sudden operation of the centrifugally operated friction clutch.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention, and therefore, such adaptations should and are intended to be comprehended within the meaning and range of equivalents of the following claims.

What is claimed is:

1. In a power transmission device for transmitting power from a drive shaft to a driven shaft by way of a planetary gear mechanism, said planetary gear mechanism having a ring gear, a sun gear disposed concentrically on the radially inner side of said ring gear, and planetary gears disposed between and engaged with said sun gear and said ring gear, the improvement comprising a pair of side plate means attached to said planetary gear mechanism for holding the meshing portions of said planetary gears, said ring gear and said sun gear from the opposite sides of the gears so as to permit free sliding movement of all of these gears relative thereto and, at the same time, acting to suppress relative axial movements of all of these gears, said side plate means serving to support at least one of said ring gear, said planetary gears and said sun gear, said side plate means being in sliding contact with only opposite side surfaces of all of the respective gears.

2. A power transmission device according to claim 1, wherein at least one of said side plate means is maintained concentrically with said planetary gears and formed circularly so as to have a diameter greater than that of said planetary gears.

3. A power transmission device according to claim 1, wherein at least one of said side plate means is formed of a resilient material so as to resiliently suppress relative axial movements of said gears engaged with one another.

4. A power transmission device according to claim 1, wherein said ring gear has an axial width smaller than that of said planetary gears; and said side plate means axially resiliently hold said ring gear from opposite side surfaces thereof.

5. A power transmission device according to claim 1, further comprising a centrifugally operated friction clutch for controlling transmission of power from said drive shaft to said planetary gear mechanism.

6. A power transmission device according to claim 5, wherein said centrifugally operated friction clutch comprises an annular outer contactor integrally formed with said ring gear, and inner contactors connected to said drive shaft for rotation therewith and adapted to be placed under a centrifugal force into frictional contact with an inner circumferential surface of said annular outer contactor to thereby transmit the rotation of said drive shaft to said ring gear when the number of revolutions of said drive shaft exceeds a predetermined level.

7. A power transmission device according to claim 5, wherein said drive shaft comprises a crank shaft rotated by an engine of a vehicle.

8. A power transmission device according to claim 7, wherein said centrifugally operated friction clutch is a starting clutch which is actuated when said vehicle is started, said driven shaft being drivably connected with a drive wheel of said vehicle.

9. A power transmission device according to claim 1, wherein said driven shaft comprises a hollow shaft concentrically enclosing said drive shaft.

* * * * *